United States Patent [19]
Hall et al.

[11] 4,214,603
[45] Jul. 29, 1980

[54] FILTER UNIT FOR A BASEBOARD HOT WATER HEATING SYSTEM

[76] Inventors: Jim Hall, c/o George Spector, 3615 Woolworth Bldg., 233 Broadway; George Spector, 3615 Woolworth Bldg., 233 Broadway, both of New York, N.Y. 10007

[21] Appl. No.: 791,066

[22] Filed: Aug. 5, 1977

[51] Int. Cl.² ............................................. F16K 24/00
[52] U.S. Cl. .................................... 137/199; 137/315
[58] Field of Search ............... 137/197, 199, 200, 549, 137/315

[56] References Cited

U.S. PATENT DOCUMENTS

| | | | |
|---|---|---|---|
| 2,931,376 | 4/1960 | Hendel | 137/197 |
| 2,972,355 | 2/1961 | Schoerner | 137/197 |

*Primary Examiner*—Alan Cohan

[57] ABSTRACT

A filter unit for a baseboard hot water heating system comprising a valve in which the filters are readily accessible by being supported on a post extending downward in the water course from the underside of a removable screw cap.

5 Claims, 6 Drawing Figures

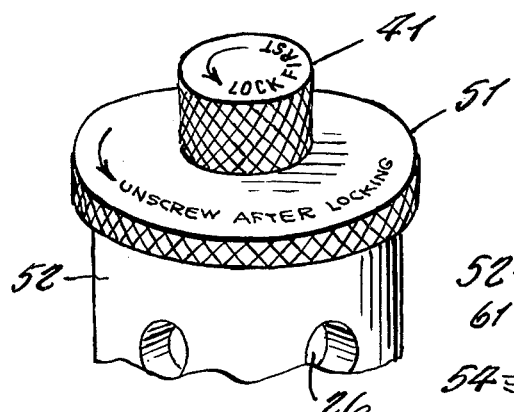
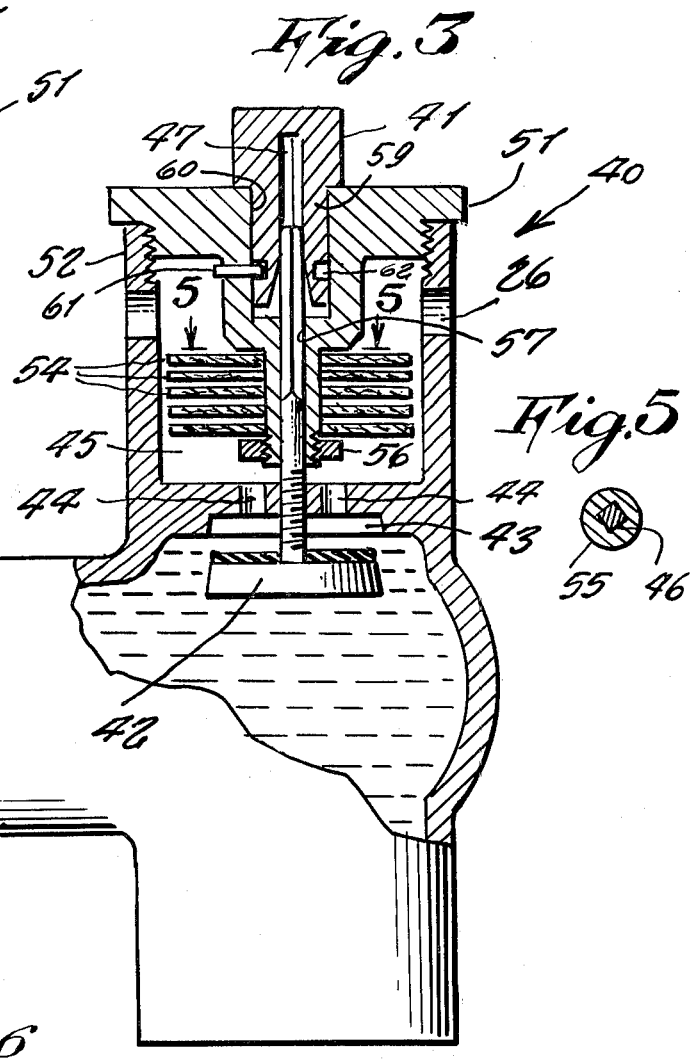
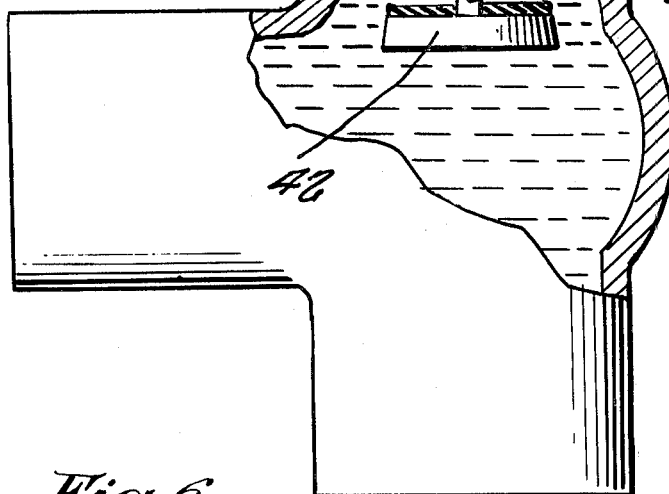
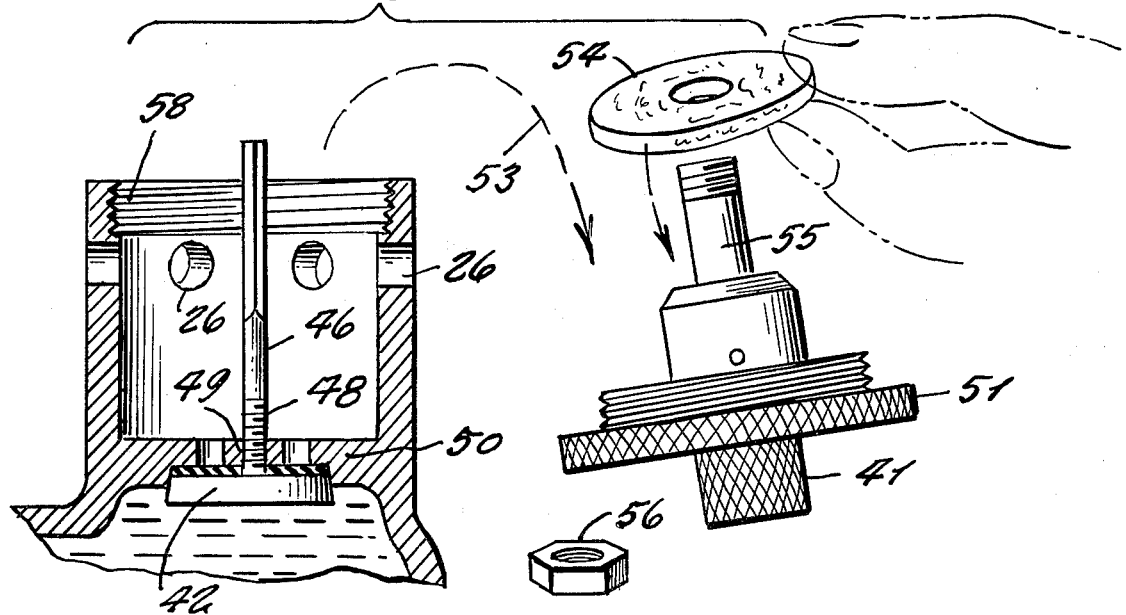

FILTER UNIT FOR A BASEBOARD HOT WATER HEATING SYSTEM

This invention relates generally to baseboard hot water heating systems. More specifically it relates to a filter unit for a baseboard hot water heating system.

It is generally well known to those skilled in the particular art of home heating systems employing baseboard hot water, that the same includes water filters that must be periodically replaced when they become worn out by no longer returning to their original size after having swelled up. This requires that the home owner drain down the heating system if he has the skill to do this laborous task himself or else to call a plumber which these days is expensive. This situation accordingly is objectionable and is, therefore, in want of an improvement.

Accordingly, it is a principal object of the present invention to provide a filter unit for a baseboard hot water heating system which allows easy access to the filters by simply removing a screw cap to lift out the filters for inspection or replacement, thus eliminating a laborous task or an expensive plumbing service call.

Another object is to provide a filter unit which in an easy manner allows letting the air out of the water system; by simply momentarily lifting off a screw cap thereof.

Other objects are to provide a baseboard hot water heating system filter unit which is simple in design, inexpensive to manufacture, rugged in construction, easy to use and efficient in operation.

These and other objects will be readily evident upon a study of the following specification and the accompanying drawing, wherein:

FIG. 3 is a cross-sectional view of a modified design of the invention.

FIG. 4 is a fragmentary top perspective view thereof.

FIG. 5 is a cross-sectional view taken on line 5—5 of FIG. 3.

FIG. 6 is a view similar to FIG. 3 and showing the cap removed so new filter discs can be installed.

Figure 1:
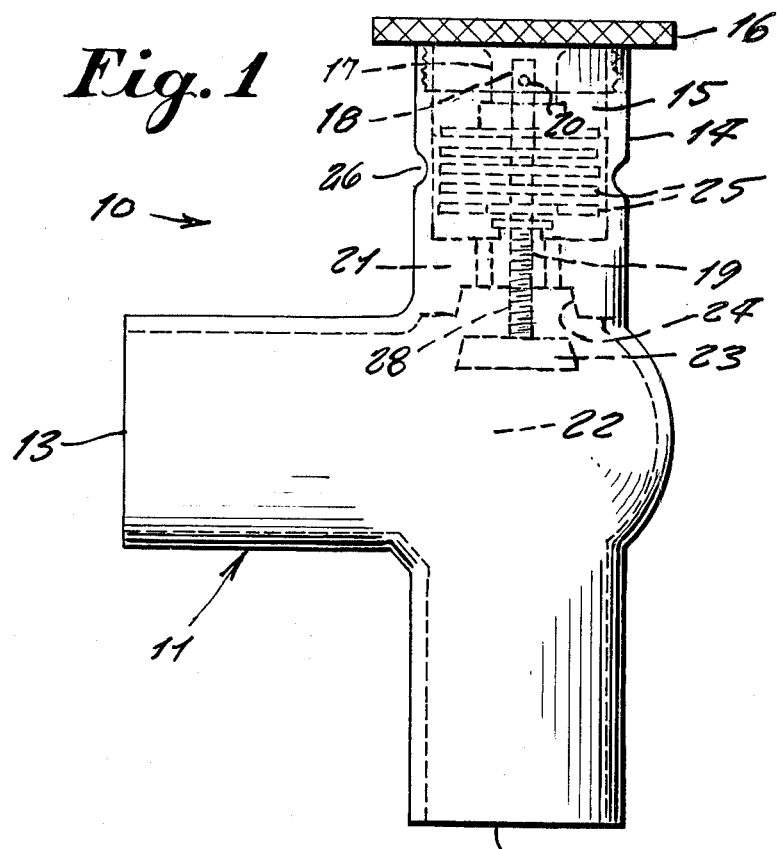
FIG. 1 is a side view of the present invention.

Referring now to the drawing in greater detail there is shown in FIG. 1 a filter unit 10 for a baseboard hot water heating system according to the present invention wherein there is a valve housing 11 having an intake opening 12 at one end and an outlet opening 13 at its other end. The housing is of elbow shape and includes an upward extension 14 having a central chamber 15 which is accessible through a top opening closeable by a screw threaded cap 16. A downward protrusion 17 on an underside of the cap has an opening 18 in which an upper end of a downward valve shaft 19 is secured by means of a cross pin 20 that is removable. The shaft 19 protrudes downward through a wall 21 and into a chamber 22, where the lower end of the shaft 19 has an enlarged head 23 contoured so to fit against a valve seat 24 formed on the underside of wall 21.

Five filters 25 of circular shape and having a central opening are removably fitted on the valve shaft 19 as shown.

In use, the filters swell up when wet so tp seal the ports 26. When these filters no longer return to their original size after swelling, the cap is removed so the filters can be removed and replaced.

In operation, when the house thermostat calls for heat, the circulator starts running and the air in the hot water heating system is forced from the baseboard copper pipe into the filter unit 10 and outward from the system by passage through openings 27, between the filter discs 25 and out of portholes 26 into the atmosphere. Thus air is eliminated from the system so to prevent any banging noise in the pipes caused by air presence. The expanding heated water rising its surface level forces the air thus outward, and when the rising water, moving behind the air, contacts the discs 25, causes them to immediately become water-saturated and swell up so to close up the spaces between the filter discs, and blocks the water from reaching the portholes. Accordingly, not even a water drop gets past the discs and spills out of the unit 10. After the heating operation stops, and the water level receeds downward again, the discs 25 start drying out and contract in size so the air freely can pass between the shrunken discs again.

Such discs can last efficiently for approximately one heating season so should be changed thereafter, because in time they do not shrink back to retracted condition anymore.

Figure 2:
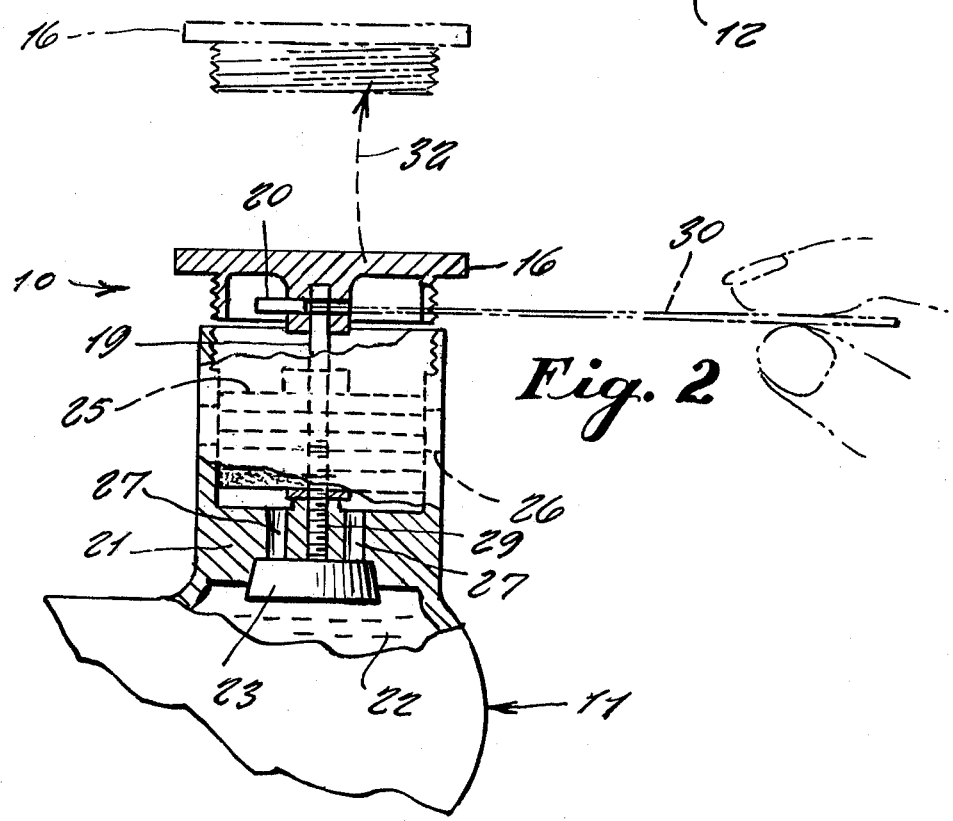
FIG. 2 is a similar view thereof shown partly in cross-section, and illustrating the cap unscrewed and in the process of being removed so to provide access to worn out filter discs that require replacement.

In order that they may be easily replaced by anyone without special skill or need of calling a plumber, all that is required is to unscrew the cap as shown in FIG. 2. The cap being connected by pin 20 to the shaft 19, thus causes the screw thread 28 on the shaft, engaged in a threaded opening 29 through wall 21, to raise the head 23 against valve seat 24 so to close the openings 27, as is clearly shown in FIG. 2. Thus water is prevented to enter the chamber 15 and spill outward of the filter unit while the filters are being changed. After the cap has thus been unscrewed and the openings 27 closed, the pin 20 is pushed by any prod 30 inserted through a side notch 31, thus disengaging the cap from the shaft, so the cap is then removed as shown by arrow 32, so to allow easy access to the discs for replacement. After the new discs are installed, the cap is replaced on the shaft and pin 20 is reinserted. The cap is then screwed down again on the housing 11 while at same time the head 23 lowers so to clear the openings 27.

In FIGS. 4, 5, and 6, another design of filter unit 40 is shown which makes disc changing still more easy, by eliminating the need of a removal of the above described pin 20.

In this design, a knob 41 is first rotated so to cause the head 42 on its lower end to lift against valve seat 43 and thus close the openings 44, and prevent using water to enter the chamber 45. A cross sectionally square upper portion of shaft 46 engages square opening 47 inside the knob. The shaft has a screw thread 48 engaging threaded opening 49 in a wall 50. Thus rotation of the knob cause rotation of the shaft in the threaded opening so to raise the head against the seat 43. After this is accomplished, the cap 51 is unscrewed off the housing 52 so to be instantly removable therefrom as shown by arrow 53 in FIG. 6.

The discs 54, fitted around stem 55 and secured thereto by a nut 56, are thus all pulled out of the chamber 45 together with cap. The nut is unscrewed, the worn discs are removed, and fresh discs are replaced on the stem and the nut is then put back so to lock the new discs from fall-off the stem. The cap is then reinstalled on the housing by inserting the cross-sectionally square end of the shaft into the central opening 57 in the stem and upward into the square opening 47 of the knob. The cap is then screwed down on the housing thread 58. After the cap is thus reinstalled, the knob is then screwed so to cause the head 42 to back away downward from the seat 43 and clear the openings 44.

In this design, the knob is integral with a shank 59 rotatable in a hole 60 in the cap. A pin 61 secured in the cap engages an annular groove 62 in the shank so to prevent the knob to slide axially while being rotated.

Thus in this design the skill of reinserting a pin 20 is eliminated, and the fishing of worn discs from the chamber 15 is also eliminated.

While various changes may be made in the detail construction, it is understood that such changes will be within the spirit and scope of the present invention, as is defined by the appended claims.

What is claimed is:

1. In an improved filter unit for a baseboard hot water heating system, comprising in combination, a valve housing having an intake at one end and an outlet at its other end, an upward extension on said housing having a chamber containing removable filters, an upper end of said chamber having an opening closed by a removable screw cap having a downward element on its underside supporting a downward valve shaft extending through said filters, a lower end of said valve shaft extending through a wall below said chamber and into a water course chamber therebelow where a valve head on said shaft seats in a valve seat on an underside of said wall, a lower portion of said shaft being screw threaded and engaged in a vertical, threaded opening through said wall, and said wall having a plurality of passage openings therethrough opening out on said seat and which are closeable by said head when engaged in said seat.

2. The combination as set forth in claim 1 wherein said element comprises a protrusion having a downward opening in which an upper end of said shaft is fitted and is secured thereto by a transverse removable pin through said protrusion and said shaft.

3. The combination as set forth in claim 1 wherein said cap has a vertical central opening therethrough, a rotatable knob extending above said cap having a shank rotatable in an upper portion of said central opening, a lower portion of said central opening receiving an upper portion of said shank, an underside of said shank having an upward central opening of square cross sectional shape, and a terminal upper part of said shaft upper portion being cross sectionally square so to be slidable axaially inside said square opening.

4. The combination as set forth in claim 3 wherein a transverse pin secured in said cap engages an annular groove around said knob shank to prevent axial displacement of said shank respective to said cap.

5. The combination as set forth in claim 1, wherein said element comprises a downwardly extending central protrusion having a central bore in which the upper end of said shaft is mounted including means for rotating the shaft in response to rotation of said cap and means for retaining said filters concentrically in at a pretermined location about said shaft.

* * * * *